UNITED STATES PATENT OFFICE.

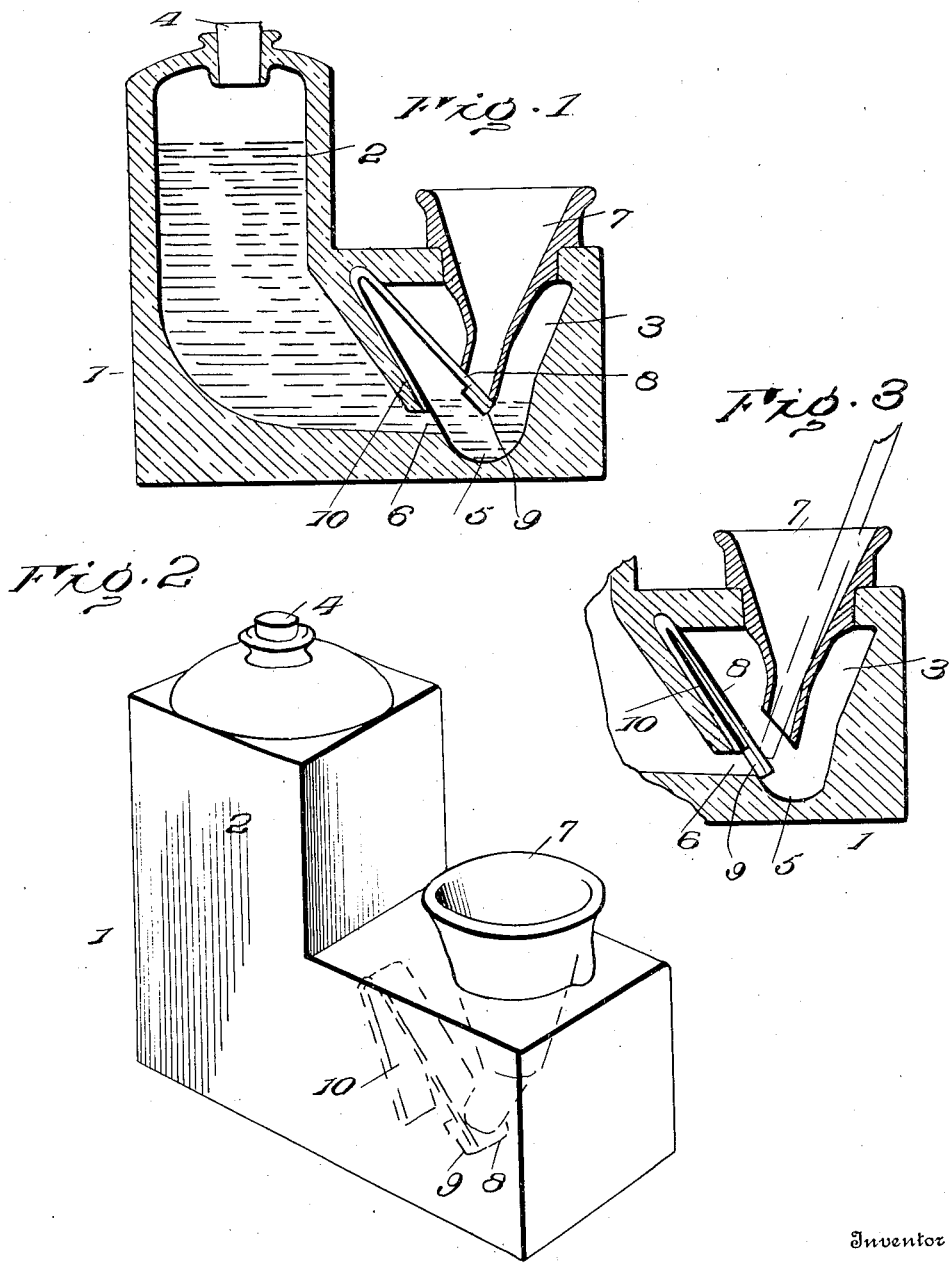

WALTER I. TISDALE, OF McNEILL, MISSISSIPPI.

INKSTAND.

No. 876,668.　　　Specification of Letters Patent.　　　Patented Jan. 14, 1908.

Application filed April 9, 1907. Serial No. 367,145.

*To all whom it may concern:*

Be it known that I, WALTER I. TISDALE, citizen of the United States, residing at McNeill, in the county of Pearl River and State of Mississippi, have invented certain new and useful Improvements in Inkstands, of which the following is a specification.

The present invention relates to certain new and useful improvements in the design of reservoir ink wells, the object being to provide a novel construction whereby the ink is automatically fed as required from a reservoir into a comparatively small dipping well, and is thereby prevented from being wasted and at the same time effectively shielded against contamination by dust or other foreign matter.

The invention also aims to provide a comparatively simple and inexpensive device of this character which can be readily taken apart and cleaned when found necessary and which will not clog or give any annoyance after a short period of use.

For a full description of the invention and the merits thereof and also to acquire a knowledge of the details of construction and the means for effecting the result, reference is to be had to the following description and accompanying drawings, in which:

Figure 1 is a vertical sectional view through an ink well constructed in accordance with the present invention. Fig. 2 is a perspective view of the ink well. Fig. 3 is a detail sectional view similar to Fig. 1 showing the spring arm as pressed inwardly to close the feed opening from the reservoir.

Corresponding and like parts are referred to in the following description and indicated in all the views of the drawings by the same reference characters.

The body portion of the ink stand as indicated at 1 may be formed of any suitable material such as glass and is provided at one side with the reservoir 2 and at the opposite side with the chamber 3. In the present instance the reservoir portion of the body 1 extends upwardly somewhat beyond the feed portion formed with the chamber 3 and is closed by means of an air tight plug 4. Located at the lower portion of the chamber 3 is the dipping well 5 which communicates with a feed opening 6 leading into the bottom of the reservoir 2. Owing to the fact that the said reservoir is provided with an air tight closure it will be readily apparent that any ink or other liquid within the reservoir will flow through the feed opening 6 into the well 5 until the level of the liquid within the well reaches the top of the opening 6. At this stage a liquid seal will be formed which prevents air from entering the reservoir through the feed opening and the liquid ceases to flow until the level of the liquid within the well 5 shall have again been lowered below the top of the opening 6. Projecting downwardly into the chamber 3 in the feed portion of the body 1 is a tubular member 7 which is preferably in the nature of a funnel as in the present instance and terminates over the well 5 in such a manner as to lead a pen into the latter. The inner or contracted portion of the tubular member 7 is cut off at an angle and is normally closed by a spring arm 8 arranged within the chamber. When a pen point is inserted through the funnel 7 however the spring arm will be forced inwardly and owing to the inclination of the same the pen point will be readily deflected downwardly so as to enter the well 5. This spring arm 8 is also designed to close the feed opening 6 while the reservoir is being filled and in order to effectively perform this function a strip of rubber or similar compressible material 9 is preferably secured to the rear face thereof. It will thus be apparent that by inserting a pen or any other suitable implement through the funnel 7 the spring arm 8 can be forced inwardly and held over the feed opening 6. In the preferred construction of the invention the spring arm 8 is integral with an arm 10 which bears against one of the side walls of the chamber 3 and coöperates with the arm 8 to impart the required resiliency thereto. Both the funnel 7 and spring 8 are removably mounted within the feed portion of the ink well and can therefore be readily taken out and cleaned when desired.

Having thus described the invention, what is claimed as new is:

1. In an ink well, the combination of a body portion provided with a reservoir and a dipping well, a feed opening being formed in the body portion and establishing communication between the reservoir and the dipping well, and a closure adapted to close either the inlet to the dipping well or the before mentioned feed opening.

2. In an ink well, the combination of a body portion provided with a reservoir and a dipping well, a feed opening being formed in the body portion and establishing communication between the reservoir and the dipping well, and a spring arm adapted to close either the inlet to the dipping well or the before mentioned feed opening.

3. In a device of the character described, the combination of a body having a reservoir formed therein and comprising a feed portion provided with a chamber the lower portion of which is in the nature of a dipping well, a feed opening being provided which communicates between the reservoir and the dipping well, a tubular member extending downwardly into the chamber of the feed portion, and a member normally closing the tubular member and designed to be moved to close the feed opening.

4. In a device of the character described, the combination of a body having a reservoir formed therein and comprising a feed portion provided with a chamber, a dipping well being formed at the bottom of the chamber and a feed opening being provided which communicates between the reservoir and the dipping well, a tubular member extending within the chamber, and a spring arm located within the chamber and normally closing the tubular member, the said spring arm being adapted to also close the feed opening.

5. In an ink well, the combination of a body portion provided with a reservoir and a dipping well, a feed opening being formed in the body portion and establishing communication between the reservoir and the dipping well, and a spring arm arranged within the dipping well and normally closing the inlet to the dipping well, the said spring arm being adapted to be deflected to close the before mentioned feed opening.

In testimony whereof I affix my signature in presence of two witnesses.

WALTER I. TISDALE. [L. S.]

Witnesses:
D. M. LOVLESS,
H. S. SMITH.